July 3, 1956 J. T. MARVIN 2,753,023
WINDSHIELD WIPER MECHANISM
Filed July 23, 1952 2 Sheets-Sheet 1

INVENTOR.
JOHN T. MARVIN
BY
*Willits, Hardman and Fehr*
ATTORNEYS

United States Patent Office 2,753,023
Patented July 3, 1956

2,753,023

WINDSHIELD WIPER MECHANISM

John T. Marvin, Xenia, Ohio, assignor to General Motors Corporation, Detroit, Mich., a corporation of Delaware Application July 23, 1952, Serial No. 300,479

11 Claims. (Cl. 192—.02)

The present invention relates to actuating mechanism for windshield wipers, and more particularly to actuating mechanism driven by an electric motor.

Due to the advent of high compression engines for motor vehicles having reduced manifold suction, coupled with the widespread utilization of curved windshields, the suction operated windshield wiper has virtually been rendered obsolete. With the attendant increase in wiper loads due to the curved windshield, power driven mechanisms of the electric motor type have increased in popularity. However, electric motor driven windshield wiper mechanisms seldom have provision for parking the blades in the manner vehicle operators have become accustomed to during the era of suction operated wipers. Accordingly, one of my objects is to provide an electric motor driven windshield wiper with means for positively driving the blades to the parked position.

The aforementioned and other objects are accomplished in the present invention by providing a variable crank throw mechanism for moving the blades to the parked position. Further means, automatically operable upon an increase of the crank throw to a maximum, are provided for simultaneously deenergizing the motor and interrupting the driving connection between the motor and the wiper oscillating mechanism. In this manner coasting of the motor after deenergization thereof will not alter the position of the wiper blades which are driven to the parked position. Specifically, the wiper actuating mechanism includes an electric motor having a stator and an armature which are axially movable relative to each other. A spring is utilized to move the armature axially upon motor deenergization, while the inherent magnetic attraction between the stator and the armature is used to effect relative axial movement therebetween upon motor energization. Axial movements of the armature and its associated shaft are used to engage and disengage cooperable clutch members for a purpose which will later be apparent.

The driven clutch member is rotatably journaled on the armature shaft and transmits rotation to a cam plate. The cam plate, though rotatably connected to the driven clutch member, is adapted for transverse movement relative to the axis of rotation under the control of a manually actuated plunger. The cam plate carries a crank pin to which a linkage mechanism for actuating the wiper blades is operatively connected. By moving the cam plate transversely with respect to the axis of rotation, the distance between the axis of rotation and the crank pin, or in other words the crank throw, may be varied. Switch means are provided for automatically deenergizing the motor upon transverse movement of the cam plate resulting in a maximum crank throw. When the crank throw is at a maximum, the blades are moved to the parked position whereupon the clutch members are disengaged so that coasting of the motor shaft will not alter the position of the blades.

Further objects and advantages of the present invention will be apparent from the following description, reference being had to the accompanying drawings wherein a preferred embodiment of the present invention is clearly shown and wherein similar reference characters denote similar parts throughout the several views.

Figure 1:
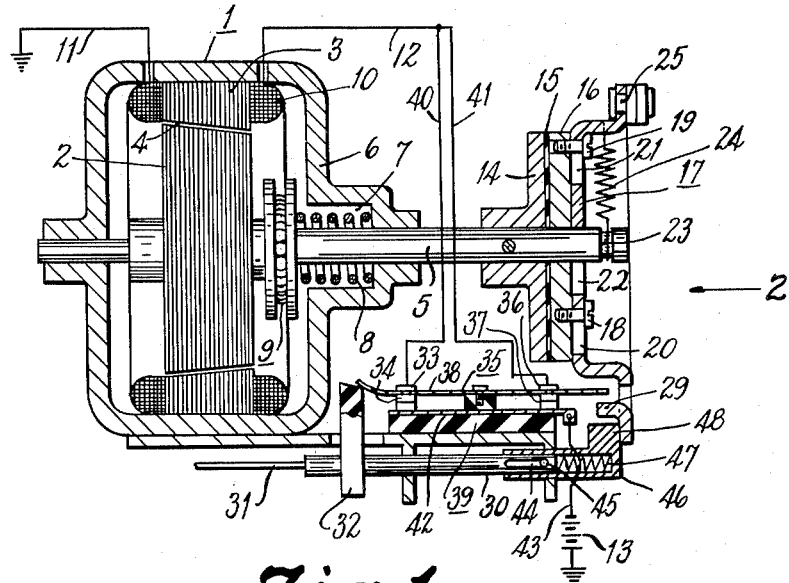
Fig. 1 is a longitudinal sectional view of windshield wiper actuating mechanism constructed according to this invention.

Referring more particularly to Fig. 1, the wiper actuating mechanism is exemplified in conjunction with a unidirectional electric motor 1 having a truncated conical armature 2 and a cooperable stator 3 providing a truncated conical air gap 4. However, it is to be understood that this particular form of motor is only by way of example and not by way of limitation as any suitable motor construction providing for relative axial movement between the stator and the armature could be used in practicing the present invention. The armature 2 is anchored to a shaft 5, which is journaled for rotation within the end plates of the motor housing 6. Disposed in a recess 7 in one of the motor end plates is a compression spring 8, which is effective to cause movement of the armature 2 and the shaft 5 to the left, as viewed in Fig. 1, during deenergization of the motor by exerting pressure on the thrust bearing assembly 9. When the motor is energized, the armature and its associated shaft 5 move axially to the right to the position they are shown in the drawing due to the magnetic attraction between the armature 2 and the stator 3. The electrical connections to the armature are not shown and they may be effected in any well known manner. The field 10 of the motor is connected by conductive leads 11 and 12 to opposite terminals of a battery 13 through switch means, to be later described.

Figures 2, 3:
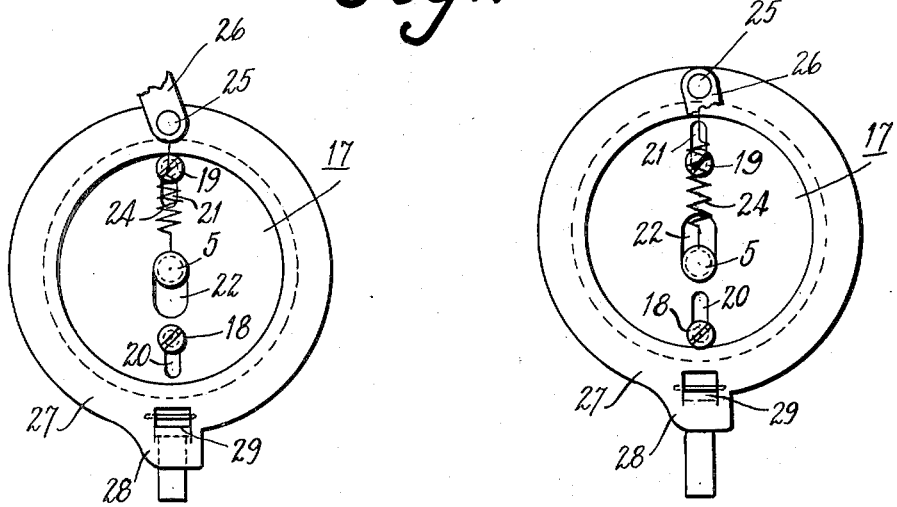
Fig. 2 is a view taken generally in the direction of arrow 2 of Fig. 1, with certain parts removed, showing the wiping position of the mechanism.
Fig. 3 is a view similar to Fig. 2 showing the position of the several elements of the mechanism in the parked position.

Anchored to an extension of the shaft 5 by means of a pin is a driving clutch member 14 having a friction facing 15 suitably attached thereto. A driven clutch member 16 is rotatably journaled on the extension of shaft 5, and drivingly engages clutch member 14 during motor energization. Referring more particularly to Figs. 1 and 2, a cam plate 17 is rotatably connected to the driven clutch member 16 by means of a pair of screw devices 18 and 19, which threadedly engage clutch member 16 and project through elongated aligned radial slots 20 and 21 of the cam plate 17. A third elongated radial slot 22 in alignment with the aforementioned slots provides an opening through which the end of shaft 5 projects. An annular groove or channel 23 is provided adjacent the end of the shaft 5, which projects through the slot 22 and within which one end of a tension spring 24 is retained. The other end of the tension spring 24 is affixed to the cam plate 17, which is substantially cup-shaped in cross section, as is shown in Fig. 1. The spring 24 normally maintains the transverse location of the cam plate 17 with respect to the shaft 5 in the position shown in Figs. 1 and 2. That is, the portions projecting through the slots 20, 21 and 22 are maintained against the upper edges thereof as depicted in Figs. 1 and 2.

Affixed to an upturned flange portion 27 of the cam plate 17 and in alignment with the aforementioned slots is a crank pin 25 which rotatably supports a crank arm 26. The crank arm 26 is operatively connected to a wiper actuating linkage forming no part of the present invention. In addition, the crank arm 26 prevents axial displacement of the clutch member 16 and the cam plate 17 during axial movement of the shaft 5. As is shown in Fig. 2, a portion of the upstanding flange 27 of the cam plate is formed as a cam surface 28, which portion is also provided with an axially extending projection 29, the purpose of which will be later described. The cam surface 28 is adapted to cooperate with the end attachment of a plunger 30, which is manually actuated by a Bowden cable 31. The plunger 30 has attached thereto a cam 32 which is utilized to separate one set of contacts 33, 34 of a double pole switch 35. The other set of switch contacts 36, 37, in effect, constitute a parking switch, which is automatically opened only after the blades have been moved to the parked position.

The circuit is completed between the several contacts of the switch 35 through a contact spring 38, which is connected intermediate its ends to a terminal block 39. Contacts 33 and 36 of the switch are connected, respectively, by lines 40 and 41 to line 12 and the field 10 of the motor, while contacts 34 and 37 are connected by conductor strap 42 and conductive lead 43 to one terminal of the battery 30. One end of the plunger 30 is provided with an axially extending slot 44 within which a transversely extending pin 45 is disposed. The extremities of the pin 45 are connected to a hollow cap member 46 within which is disposed a spring 47 for a purpose to be described. The hollow cap member 46 is provided with an upstanding projection 48, which, when positioned in axial alignment with the flange portion 27 of the cam plate 17, will effect transverse movement of the cam plate by riding upon the cam surface 28 thereof. As the projection 48 can only be moved into radial alignment with the upstanding flange portion 27 of the cam plate when the cam surface 28 is angularly displaced therefrom, the spring 47 disposed within the hollow cap 46 is utilized to take up the motion of the plunger 30, should the plunger be moved to the right, as viewed in Fig. 1, when the projection 47 and the cam surface 28 are in angular alignment. However, as soon as the cam portion 28 and the projection 48 are angularly displaced, the spring 47, having been compressed, will move the cap member 46 and the projection 48 into the path of the cam surface 28 to a position determined by the pin and slot connection of the cap to the plunger 30.

The cam plate 17 will be moved transversely of the shaft 5 to a position wherein the members projecting through the several slots of the cam plate will engage the lower edges of the slots, as viewed in Fig. 3, when the projection 48 rides up on the cam surface 28. Coincident with movement of the cam plate 17, as effected by the projection 48, the projection 29 will engage one end of the spring contact 38 and separate contacts 36 and 37 of the switch 35. As contacts 33 and 34 will have been previously separated by movement of the plunger and cam 32 to the right, as viewed in Fig. 1, the motor 1 will be deenergized upon transverse movement of the cam plate 17, which results in a maximum crank throw transmitted to the crank arm 26 through the crank pin 25. The effective length of the crank arm 26 is determined by the distance between the axis of the shaft 5 and the axis of the crank pin 25, which, in turn, is determined by the position of the cam plate 17 with respect to the driven clutch member 16.

Figure 4:
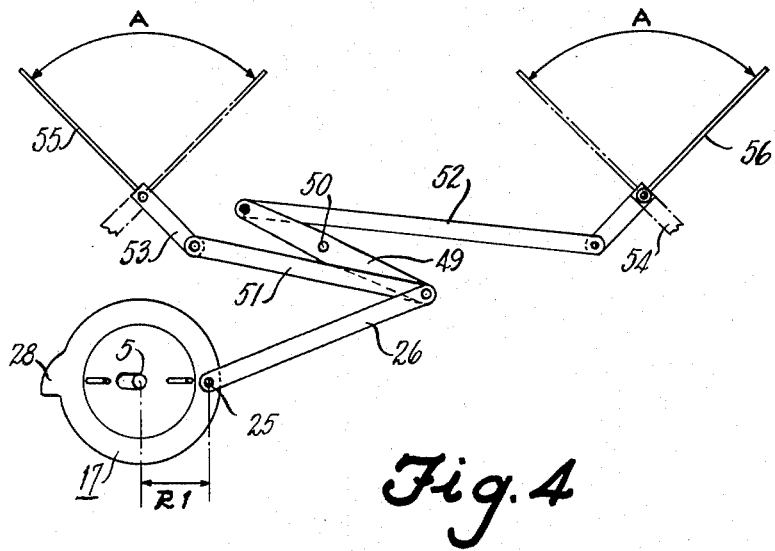
Fig. 4 is a diagrammatic view of the mechanism and its associated linkage in the wiping position.
Figure 5:
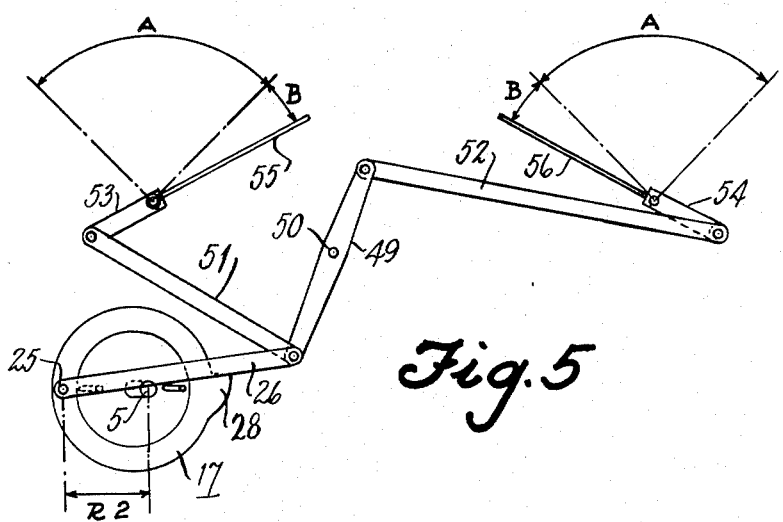
Fig. 5 is a view similar to Fig. 4 showing the position of the several parts in the parked position.

Referring more particularly to Figs. 4 and 5, the operation of the mechanism will be discussed in conjunction with a diagrammatic representation of the windshield wiper mechanism. As is shown, the crank arm 26 is pivotally connected to one end of an oscillating arm 49, which is pivoted intermediate its ends at 50 to any rigid structure of a motor vehicle. Links 51 and 52 are pivotally connected to opposite ends of the arm 49, which links are, respectively, connected by links 53 and 54 to a pair of wiper blades 55 and 56. With the plunger 30 in the position shown in Fig. 1, the motor 1 is energized and the shaft 5 will be rotated. Movement of the shaft 5 will be transmitted through the engaged clutch members 15 and 16 to the cam plate 17 and, thence, by the crank pin 25 to the crank arm 26 at a distance of R1 between the axis of the crank pin 25 and the axis of the shaft 5. In this instance the blades 55 and 56 will be oscillated throughout the arcuate distance A, which constitutes the wiping stroke thereof.

These conditions will prevail until the vehicle operator moves the plunger 30 by means of the Bowden cable 31 to the right, thereby positioning hollow cap 46 and the projection 48 in alignment with the upstanding flange 27 of the cam plate. Movement of the plunger 30 will also separate contacts 33 and 34 of the switch 35 by reason of cam 32 engaging one end of the spring 38. However, the motor 1 will still be energized by reason of the contacts 36 and 37 remaining closed until the projection 48 engages the cam surface 28 of the flange 27, thereby effecting transverse movement of the cam plate 17 from the position shown in Fig. 2 to the position shown in Fig. 3. The instant that the cam plate reaches the position shown in Fig. 3, the projection 29 will raise the other end of spring 38, thereby separating contacts 36 and 37 and deenergizing the motor 1. The distance between the axis of the shaft 5 and the crank pin 25 has now been increased to a maximum value of R2, in which instance, the effective length of the crank arm 26 has been increased enabling movement of the blades 55 and 56 out of the normal range of travel through the arcuate distance B to a parked position. The blades 55 and 56 only reach the parked position thereof when the cam plate 17 has been moved to the position it is shown in Fig. 3, whereupon the motor is deenergized by separation of contacts 36 and 37 and the spring 7 acting through the thrust bearing assembly 9 moves the armature 2 and the shaft 5 to the left, as viewed in Fig. 1, thereby disengaging clutch members 14 and 15. In this manner coasting of the motor shaft 5 after motor deenergization will not alter the position of the blades 55 and 56 as the driving connection therebetween has been interrupted.

When the vehicle operation desires wiping action of the blades 55 and 56, the Bowden wire 31 is manipulated to move the plunger 31 to the position it is shown in Fig. 1, whereupon contacts 33 and 34 are again placed in engagement and the motor 1 is energized. Upon energization of the motor, magnetic attraction between the armature and the stator thereof will move the armature and its associated shaft 5 to the right, thereby compressing spring 8 and effecting engagement between clutch members 14 and 16, whereupon the cam plate 17 will be rotated. Movement of the plunger 30 also withdraws the projection from the path of the cam surface 28, whereupon the spring 24 effects transverse movement of the cam plate 17 from the position it is shown in Fig. 3 to the position shown in Fig. 2. As this movement automatically decreases the distance between the axis of the shaft 5 and the axis of the crank pin 25 from R2 to R1, rotation of the cam plate will only effect movement of the blades 55 and 56 throughout the arcuate distance A.

From the foregoing description it is apparent that the present invention provides windshield wiper actuating mechanism driven by a unidirectional electric motor of such a character that the wiper blades are driven to the parked position. Moreover, clutch means are provided whereby the coasting of the motor after deenergization will not alter the position of the blades by reason of the clutch being automatically disengaged upon deenergization thereof. This feature is of particular importance in that it assures that the blades will always be parked in the same position. Moreover, by reason of the wiper blades being driven to the parked position, ice formation on the blades may be removed through periodic on and off manipulations of the Bowden cable 31 in a manner similar to that which may be accomplished with suction actuated wipers.

While the embodiment of the present invention as herein disclosed, constitutes a preferred form, it is to be understood that other forms might be adopted.

What is claimed is as follows:

1. Windshield wiper actuating mechanism including, a rotatable driving member, a wiper actuating driven element, variable throw crank mechanism interconnecting the driving member and the driven element, said crank mechanism including a cam plate rotatably connected to said driving member, the connection between said cam plate and said driving member permitting only straight line movement of said cam plate transversely of the axis of said driving member, and means selectively engageable with said cam plate for bodily moving the same to vary the throw of said crank mechanism.

2. Windshield wiper actuating mechanism including, a rotatable driving member, a wiper actuating driven element, variable throw crank mechanism interconnecting the driving member and the driven element, said crank mechanism including a cam plate having an elongated slot, means projecting through said slot and having connection with said driving member whereby said crank plate is rotatable with said driving member, the connection between said cam plate and said driving member permitting only straight line movement of said cam plate transversely of the axis of said driving member, and resilient means normally maintaining the crank throw at a minimum, and means selectively engageable with said cam plate for bodily moving the same to overcome said resilient means and thereby increase the crank throw to a maximum.

3. Windshield wiper actuating mechanism including, a rotatable driving member, a driven member, means rotatably connected to said driven member, the connection between said means and said driven member permitting only straight line movement of the said means transversely of the axis of said driven member, a wiper actuating element carried by said first recited means, and means for effecting straight line transverse movement of said first recited means to vary the distance between said wiper actuating element and the axis of said driven member.

4. Windshield wiper actuating mechanism including, a rotatable driving member, a rotatable driven member, a cam plate rotatably connected to said driven member, the connection between said cam plate and said driven member permitting only straight line movement of said cam plate transversely of the axis of said driven member, a wiper actuating element carried by said cam plate, and manually operated means for effecting straight line transverse movement of said cam plate to vary the distance between said wiper actuating element and the axis of said driven member.

5. Windshield wiper actuating mechanism including a rotatable driving member, a rotatable driven member, magnetically engageable and resiliently disengageable clutch mechanism interconnecting said driving and driven members, means rotatably connected to said driven member but adapted for movement transversely with respect to the axis thereof, a wiper actuating element carried by said first recited means, means for effecting transverse movement of said first recited means to vary the distance between said wiper actuating element and the axis of said driven member, and means automatically operable to interrupt the clutch engaging magnetic force and to permit resilient disengagement of said clutch mechanism when said distance is at a maximum.

6. Windshield wiper actuating mechanism including, a rotatable driving member, a rotatable driven member, magnetically engageable clutch mechanism interconnecting said driving and driven members, a cam plate rotatably connected to said driven member but adapted for movement transversely with respect to the axis thereof, wiper actuating means carried by said cam plate, manually operated means for effecting transverse movement of said cam plate to vary the distance between said wiper actuating means and the axis of said driven member, and resilient means automatically operable upon a predetermined transverse movement of said cam plate to disengage said clutch mechanism.

7. Windshield wiper actuating mechanism including, an electric motor, normally closed switch means in circuit with said motor for effecting energization thereof, a shaft driven by said motor, disengageable clutch mechanism associated with said shaft including a first member rotatably connected to said shaft and a second member rotatably journaled on said shaft, said clutch mechanism being magnetically associated with said motor so as to be engaged during motor energization, a wiper actuating driven element, variable throw crank mechanism interconnecting the second clutch member with said driven element, means selectively engageable with said crank mechanism for bodily moving the same to vary the throw thereof and means carried by said crank mechanism for opening said switch means upon an increase of the crank throw to a maximum, and means rendered effective upon opening of said switch means for disengaging said clutch members.

8. Windshield wiper actuating mechanism including, a unidirectional electric motor, normally closed switch means in circuit with said motor for effecting energization thereof, a shaft driven by said motor, disengageable clutch mechanism associated with said shaft including a driving member rotatably connected to said shaft and a driven member rotatably journaled on said shaft, said clutch mechanism being magnetically associated with said motor so as to be engaged during motor energization, means rotatably connected to said driven member but adapted for movement transversely with respect to the axis thereof, a wiper actuating element carried by said first recited means, means for effecting transverse movement of said first recited means to vary the distance between said wiper actuating element and the axis of said driven member, means operable upon a predetermined transverse movement of said first recited means for opening said switch means to deenergize said motor, and means operable upon deenergization of said motor for disengaging said clutch members.

9. Windshield wiper actuating mechanism including, an electric motor having a stator and an armature disposed for axial movement relative to each other, resilient means operatively connected to said armature for effecting axial movement thereof in one direction, the magnetic attraction between said armature and stator effecting movement of said armature in the other direction, disengageable clutch mechanism associated with said armature, a wiper actuating element having operative connection with said clutch mechanism, and switch means automatically operable to deenergize said motor at a predetermined position of said wiper actuating element enabling said resilient means to disengage said clutch mechanism whereby the motor coasting will not alter the position of said wiper actuating element.

10. Windshield wiper actuating mechanism for causing an element to move to a predetermined position and remain there, including in combination, an electric motor, means including variable throw crank mechanism and disengageable clutch mechanism interconnecting said motor and said element, said clutch mechanism being magnetically associated with said motor so as to be engaged during motor energization, and means operable to vary the throw of said crank mechanism to move said element to said predetermined position and simultaneously there-with deenergizing said motor to disengage said clutch mechanism.

11. Windshield wiper actuating mechanism for causing an element to move to a predetermined position and remain there, including in combination, an electric motor, a circuit for energizing said electric motor, means including variable throw crank mechanism and disengageable clutch mechanism interconnecting said motor and said element, said clutch mechanism being magnetically associated with said motor so as to be engaged during motor energization, means operable to vary the throw of said crank mechanism to move said element to said predetermined position, switch means in said circuit for automatically deenergizing said motor when said element arrives at said predetermined position, and means operable to disengage said clutch mechanism upon deenergization of said motor.

References Cited in the file of this patent
UNITED STATES PATENTS

| | | |
|---|---|---|
| 1,956,041 | Naul | Apr. 24, 1934 |
| 2,085,442 | Newell | June 29, 1937 |
| 2,137,628 | Sayre | Nov. 22, 1938 |
| 2,195,219 | McGoldrick | Mar. 26, 1940 |
| 2,208,549 | Plensler | July 16, 1940 |
| 2,335,424 | Korte | Nov. 30, 1943 |
| 2,452,496 | Schneider | Oct. 26, 1948 |
| 2,513,247 | Morton | June 27, 1950 |